(12) United States Patent
Fait

(10) Patent No.: US 6,703,458 B2
(45) Date of Patent: Mar. 9, 2004

(54) CATALYST COMPONENTS FOR THE POLYMERIZATION OF OLEFINS

(75) Inventor: Anna Fait, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/182,038

(22) PCT Filed: Dec. 17, 2001

(86) PCT No.: PCT/EP01/15024

§ 371 (c)(1),
(2), (4) Date: Jul. 24, 2002

(87) PCT Pub. No.: WO02/051877

PCT Pub. Date: Jul. 4, 2002

(65) Prior Publication Data

US 2003/0018146 A1 Jan. 23, 2003

(30) Foreign Application Priority Data

Dec. 22, 2000 (EP) .......................................... 002047066

(51) Int. Cl.[7] .................................................. C08F 4/42
(52) U.S. Cl. ...................... 526/160; 526/943; 526/904; 526/158; 526/348; 502/103; 502/109; 502/152; 502/159; 502/402; 502/439
(58) Field of Search ................................ 526/160, 348, 526/943, 904, 158; 502/103, 109, 152, 402, 439

(56) References Cited

U.S. PATENT DOCUMENTS

| | | | |
|---|---|---|---|
| 4,769,510 A | 9/1988 | Kaminsky et al. | 585/512 |
| 5,081,322 A | 1/1992 | Winter et al. | 585/9 |
| 5,106,804 A | 4/1992 | Bailly et al. | 502/108 |
| 5,132,262 A | 7/1992 | Rieger et al. | 502/117 |
| 5,145,819 A | 9/1992 | Winter et al. | 502/117 |
| 5,162,278 A | 11/1992 | Razavi | 502/152 |
| 5,239,022 A | 8/1993 | Winter et al. | 526/127 |
| 5,243,001 A | 9/1993 | Winter et al. | 526/127 |
| 5,296,434 A | 3/1994 | Karl et al. | 502/117 |
| 5,346,925 A * | 9/1994 | Sugano et al. | 521/54 |
| 5,514,760 A | 5/1996 | Karl et al. | 526/127 |
| 5,556,928 A | 9/1996 | Devore et al. | 526/127 |
| 6,013,594 A * | 1/2000 | Yang et al. | 502/103 |
| 6,096,912 A | 8/2000 | Karl et al. | 556/11 |

FOREIGN PATENT DOCUMENTS

| | | | |
|---|---|---|---|
| EP | 0129368 | 12/1984 | ........... C08F/10/00 |
| EP | 0185918 | 7/1986 | ........... C08F/10/00 |
| EP | 0 447 070 A1 * | 9/1991 | |
| EP | 0447070 | 9/1991 | ........... C08F/10/02 |
| EP | 0485820 | 5/1992 | ........... C08F/4/602 |
| EP | 0485822 | 5/1992 | ........... C08F/4/602 |
| EP | 0485823 | 5/1992 | ........... C07F/17/00 |
| EP | 0519237 | 12/1992 | ........... C08F/10/00 |
| EP | 0575875 | 12/1993 | ........... C08F/4/642 |
| EP | 0798315 | 10/1997 | ........... C08F/10/00 |
| EP | 1181979 | 2/2002 | ............ B01J/31/16 |
| WO | 9602580 | 2/1996 | ........... C08F/4/642 |
| WO | 9622995 | 8/1996 | ........... C07F/17/00 |
| WO | 9623010 | 8/1996 | ......... C08F/210/16 |
| WO | 9634020 | 10/1996 | ........... C08F/10/00 |
| WO | 9822486 | 5/1998 | ........... C07F/17/00 |
| WO | 9921899 | 5/1999 | ........... C08F/10/02 |
| WO | 9924446 | 5/1999 | ........... C07F/17/00 |
| WO | 9958539 | 11/1999 | ........... C07F/17/00 |
| WO | WO 00/22007 * | 4/2000 | |
| WO | 0022007 | 4/2000 | ............. C08F/4/70 |
| WO | 0121674 | 3/2001 | ........... C08F/10/00 |

OTHER PUBLICATIONS

Ravve, Organic Chemistry of Macromolecules, pp. 212–213, Dekker4 (1967).*
Ser van der Ven, Polypropylene and other Polyolefins, pp. 470–472, Elsevier (1990).*

* cited by examiner

*Primary Examiner*—Ling-Siu Choi

(57) ABSTRACT

Spherical catalyst components for the polymerization of olefins of formula RCH=CHR, in which R is, independently, hydrogen or a hydrocarbon group with 1–10 carbon atoms, containing a homogeneous transition metal compound of formula $MP_x$, in which M is a transition metal M of Groups 3 to 11 or the lanthanide or actinide Groups of the Periodic Table of the Elements (new IUPAC version); P is a ligand that is coordinated to the metal M and x is the valence of the metal M. The transition metal compound is dispersed in a solid hydrocarbon matrix having a melting point above 70° C.

19 Claims, No Drawings

CATALYST COMPONENTS FOR THE POLYMERIZATION OF OLEFINS

This application is the U.S. national phase of International Application PCT/EP01/15024, filed Dec. 17, 2001.

The present invention relates to components of catalysts for the polymerization of olefins and the process for their preparation, the catalysts obtained from them and the use of the said catalysts in the polymerization of olefins. Homogeneous catalysts for the polymerization of olefins obtained from compounds of formula $ML_x$ in which M is a transition metal especially Ti, Zr, Hf, Cr, Pd and Ni, L is a ligand that is coordinated to the metal, and x is the valence of the metal, are known from the literature. Examples of catalysts of this type with very high activity are those obtained by reacting metallocene compounds $Cp_2ZrCl_2$ or $Cp_2TiCl_2$, or their derivatives substituted in the cyclopentadienyl ring, with polyalumoxane compounds containing the —(R)AlO— repeating unit, in which R is preferably methyl (U.S. Pat. No. 4,542,199 and EP-A-129368). Catalysts of the aforementioned type in which the metallocene compound contains two indenyl or tetrahydroindenyl rings with a bridging bond to lower alkylenes or to other divalent radicals are suitable for the preparation of stereoregular polymers of propylene and of other alpha olefins (EP-A-185918).

Stereospecific catalysts are also obtained from dicyclopentadienyl compounds in which the two rings are substituted in various ways with groups with steric hindrance such as to impede the rotation of the rings about the axis with the metal. The substitution of the cyclopentadienyl ring of indenyl or tetrahydroindenyl in suitable positions supplies catalysts that are endowed with very high stereospecificity (EP-A-485823, EP-A-485820, EP-A-519237, U.S. Pat. No. 5,132,262 and U.S. Pat. No. 5,162,278). The catalysts described above supply polymers with very narrow molecular weight distribution (Mw/Mn of about 2).

Furthermore, some of these catalysts have the property of forming copolymers of ethylene with alpha olefins of the LLDPE type or elastomeric ethylene/propylene copolymers with very uniform distribution of the comonomenic units. The LLDPE polyethylene obtained is further characterized by low solubility in solvents such as xylene or n-decane.

The polypropylene obtained with the more stereospecific catalysts mentioned above exhibits greater crystallinity and a higher distortion temperature relative to the polymer obtainable with the conventional heterogeneous Ziegler-Natta catalysts.

Homogeneous catalysts with a different structure are described in international patent application WO 96/23010. These catalysts, comprising a complex between a transition metal and at least one bidentate ligand that has a particular structure, are capable of polymerizing olefins to give a wide range of polymers including copolymers comprising olefins and polar monomers such as carbon monoxide, vinylacetate, (meta)acrylates etc.

Despite their excellent properties in terms of quality of the polymeric products, considerable difficulties are encountered when said homogeneous catalysts are to be used in industrial processes of production of polyolefins that are not carried out in solution. The homogeneous catalysts in fact, are not able to provide polymers with a regular morphology when used in processes such as polymerization in gas-phase. In order to make it possible their use in non-solution polymerization processes, the homogeneous catalysts have to be made heterogeneous by supporting them on suitable supports that are able to endow the catalyst with appropriate morphological properties. Various kinds of supports can be used for this purpose including, among others, metal oxides such as silica, magnesium halides or polymeric supports such as polyethylene, polypropylene and polystyrene. A characteristic that is common to these supports is that they are porous and so enable the metallocene compound to be fixed by being deposited in the pores. The catalytic components thus obtained are therefore in the form of particles of inert material, organic or inorganic, carrying in the surface layer, in correspondence of the pores, the transition metal compound that constitutes one of the components of the catalyst. To achieve efficient support, however, the porosity of the support must be accurately controlled. Moreover, since the extent of supportation depends mainly on the porosity of the support particles, it also proves very difficult to achieve homogeneous distribution of the quantity of compound supported because the individual support particles or fractions have differences in porosity that are sometimes very considerable. In any case, the upper limit of the amount of transition metal compound that can be supported is always determined by the porosity of the support. For example, U.S. Pat. No. 5,106,804 describes catalysts comprising a metallocene compound supported on $MgCl_2$ in spherical form and partially complexed with an electron-donor compound in which the amount of Zr compound supported on $MgCl_2$ is relatively low (the Zr/Mg ratio in the catalyst is less than about 0.05). Furthermore, the polymerization yields are not such as to make it possible to obtain polymers containing sufficiently low residues of the catalyst. It is in fact known that supporting tends to lower the activity of homogeneous catalysts considerably. European patent EP 798315 describes a method of preparing homogeneous mixtures consisting of a metallocene, a cocatalyst and a dispersing medium having a oily or waxy consistency that is selected among the non-aromatic long-chain hydrocarbons that have boiling point above 150° C. and viscosity of at least 1 Pa·s at 25° C. According to the inventors these mixtures are endowed with improved stability. Although included in the generic description, the use of a specific hydrocarbon matrix with a melting point above 70° C. as a dispersing medium it is never described specifically. Nor, moreover, is there any specific description of a solid catalytic component in spherical form that comprises a homogeneous catalyst dispersed within a solid hydrocarbon matrix at room temperature. The only use of a solid dispersing medium is reported in Example 3 describing the preparation of solid mass of a paraffinic wax having a melting point between 65 and 70° C. and containing methyl alumoxane in an amount equal to approx. 66 wt. %, which has then been mechanically comminuted to a fine grain powder. In addition to the fact that these mixtures do not possess a suitable morphology, it is also important to observe that according to Table 1 of the said application, the metallocene compound is not present in the formulation of Example 3. As it can be seen from the polymerization data, however, the yields that are obtained using this catalyst are very low even if further alumoxane is added in the reactor. International patent application WO 96/34020 describes a method of preparation of a solid catalyst that comprises supporting a metallocene and an activator on a support, preferably porous, and then coating the said supported catalyst with an inert organic material that is preferably a hydrocarbon component of molecular weight between 200 and 20 000 and is soluble in aromatic solvents at temperatures above 70° C. According to the said patent application, the catalyst thus prepared makes it possible to overcome the problem of reactor fouling, but the polymerization yields (expressed in terms of kg of polymer per g of transition metal) are very low. Surprisingly, it was found that the solid components of catalysts obtained by dispersing a homogeneous catalyst within a hydrocarbon matrix possessing certain characteristics are capable of forming catalysts that have high activity and are able to produce polymers with excellent morphological properties. An object of the present invention therefore comprises spherical catalyst components for the polymerization of formula RCH=CHR, in which R is independently hydrogen or a hydrocarbon group with 1–10 carbon atoms, comprising a homogeneous transition metal compound of formula $MP_x$, in which M is a transition metal from Groups 3 to 11 or the lanthanide or actinide Groups of the Periodic Table of the Elements (new IUPAC version), P is a ligand coordinated to the metal M and x is the valence of the metal M. The transition metal compound is dispersed in a solid hydrocarbon matrix that has a melting point above 70° C. Hydrocarbon matrices with a melting point above 80° C. are particularly preferred, and even more preferably above 90° C. The said matrix is preferably selected from the group comprising solid paraffinic waxes, polyolefins or their mixtures. The use of solid paraffinic waxes is particularly preferred.

Preferably, moreover, the said matrix, in contrast to the supports commonly employed in this technology, is characterized by very low porosity. In particular the porosity, measured by the mercury method, is less than 0.3 cm$^3$/g and preferably below 0.15 cm$^3$/g. The solid paraffinic waxes are generally indicated as the products that are derived from the fraction of lubricating oils that is in its turn obtained by fractional distillation of crude oil. When this fraction is cooled the waxes separate from the oils and are deposited as solid products, which are then recovered by filtration. From the chemical standpoint, the waxes are mixtures comprising straight-chain, branched-chain or cyclic hydrocarbons. The polyolefins that can be used as solid matrix of the present invention comprise the polyolefins generally known in the art, such as (co)polymers of ethylene (HDPE, LLDPE), of propylene (isotactic, atactic and syndiotactic homopolymers of polypropylene, random copolymers with ethylene, butene-1, hexene-1 or their mixtures) and of butene as well as polyolefins obtained by the polymerization of vinylaromatic monomers such as styrene, divinylbenzene, etc. Among the polyolefins that can be used according to the present invention, the preferred ones are the (co)polymers of ethylene having low and very low molecular weight (i.e. those having an intrinsic viscosity lower than 5, preferably between 0.1 and 4, the ethylene copolymers that have a percentage by weight of comonomer greater than 10%, the highly modified copolymers of propylene and the elastomeric ethylene-α-olefin copolymers, possibly containing minor proportions of diene or polyene. As is well known, these polymers can be obtained for example by polymerization of the starting olefins carried out in the presence of catalysts of the Ziegler-Natta type comprising the product of reaction between an organometallic compound and a transition metal compound preferably selected from Ti or V. As described previously, the catalyst components of the invention comprise a compound containing a transition metal M selected from the Groups 3 to 11 or the lanthanide or actinide groups of the Periodic Table of the Elements (new IUPAC version). In particular, in the said compound the transition metal is preferably selected among Ti, V, Zr, Hf, Sc, Cr, Fe, Co, Ni, and Pd. In one of the preferred embodiments, the said transition metal compound is selected among the compounds of formula (I)

$$QL_lZMX'_p \tag{I}$$

wherein Q is a substituted or unsubstituted cyclopentadienyl radical, which can have one or more condensed cycles and which can contain heteroatoms, such as indenyl, tetrahydroindenyl, fluorenyl, octahydrofluorenyl, tetrahydrofluorenyl, indolyl, thiopenthyl, dithiophenecyclopentadienyl; Z has the same meaning as Q or it can be =NR$^8$, —O—, —S— or =PR$^8$, wherein R$^8$ is hydrogen or a C$_1$–C$_{20}$-alkyl, C$_3$–C$_{20}$-cycloalkyl, C$_2$–C$_{20}$-alkenyl, C$_6$–C$_{20}$-aryl, C$_7$–C$_{20}$-alkylaryl or C$_7$–C$_{20}$-aryalkyl radical which can contain a heteroatom; L is a divalent bridge connecting the moieties Q and Z preferably selected from the group consisting of C$_1$–C$_{20}$-alkylidene, C$_3$–C$_{20}$-cycloalkylidene, C$_2$–C$_{20}$-alkenylidene, C$_6$–C$_{20}$-arylidene, C$_7$–C$_{20}$-alkylarylidene or C$_7$–C$_{20}$-aryalkylidene radicals which can contain a heteroatom; more preferably L is selected from the group consisting of CR$^3{}_2$, C$_2$R$^3{}_4$, SiR$^3{}_2$, Si$_2$R$^3{}_4$ or CR$^3{}_2$SiR$^3{}_2$ wherein R3 is hydrogen or a C$_1$–C$_{20}$-alkyl, C$_3$–C$_{20}$-cycloalkyl, C$_2$–C$_{20}$-alkenyl, C$_6$–C$_{20}$-aryl, C$_7$–C$_{20}$-alkylaryl or C$_7$–C$_{20}$-aryalkyl radical which can contain a heteroatom; preferably R$^3$ is hydrogen, methyl or phenyl; M is a transition metal M from Groups 3 to 10 or the lanthanide or actinide groups of the Periodic Table of the Elements (new IUPAC version); X is a ligand, same or different, selected from hydrogen, a halogen, or a R$^9$, OR$^9$, OSO$_2$CF$_3$, OCOR$^9$, SR$^9$, NR$^9{}_2$ or PR$^9{}_2$ group, wherein R$^9$ is hydrogen or a C$_1$–C$_{20}$-alkyl, C$_3$–C$_{20}$-cycloalkyl, C$_2$–C$_{20}$-alkenyl, C$_6$–C$_{20}$-aryl, C$_7$–C$_{20}$-alkylaryl or C$_7$–C$_{20}$-aryalkyl radical, optionally containing a heteroatom; p is an integer of from 0 to 3, preferably from 1 to 3, more preferably 2, which integer is equal to the oxidation state of the metal M minus 2; and l is 0 or 1. Non-limiting examples of compounds of formula (I) are those described in WO 98/22486, WO 99/58539 WO 99/24446, U.S. Pat. No. 5,556,928, WO 96/22995 EP-485822 and EP-485820. Another class of preferred catalysts is that comprising a late transition metal complex corresponding to formula (II) or (III):

$$LMX_pX'_s \tag{II}$$

$$LMA \tag{III}$$

wherein M is a metal belonging to Groups 8, 9, 10 or 11 of the Periodic Table of the Elements (new IUPAC notation); L is a bidentate or tridentate ligand of formula (IV):

$$\left[ R^1{}_m\!\!-\!\!E^1\diagdown^B\diagup E^2\!\!-\!\!R^1{}_n \right]^q \tag{IV}$$

wherein B is a C$_1$–C$_{50}$ bridging group linking E$^1$ and E$^2$, optionally containing one or more elements of Groups 13–17 of the Periodic Table; E$^1$ and E$^2$ are elements, the same or different from each other, belonging to Group 15 or 16 of the Periodic Table and are bonded to metal M; the substituents R$^1$, the same or different from each other, are hydrogen or a linear or branched, saturated or unsaturated C$_1$–C$_{20}$ alkyl, C$_1$–C$_{20}$ alkylidene, C$_3$–C$_{20}$ cycloalkyl, C$_6$–C$_{20}$ aryl, C$_7$–C$_{20}$ alkylaryl and C$_7$–C$_{20}$ arylalkyl radical, optionally containing one or more elements of Groups 13–17 of the Periodic Table of the Elements, such as B, Al, Si, Ge, N, P, O, S, F and Cl atoms; or two R$^1$ substituents are attached to the same atom E$^1$ or E$^2$ to form a saturated, unsaturated or aromatic C$_4$–C$_8$ ring, having from 4 to 20 carbon atoms; m and n are independently 0, 1 or 2, depending on the valence of E$^1$ and E$^2$, so as to satisfy the valence number of E$^1$ and E$^2$; q is the charge of the bidentate or tridentate ligand so that the oxidation state of MX$_p$X'$_s$ or MA is satisfied, and the complex of formula (II) or (III) is overall neutral; X are monoanionic sigma ligands, the same or different from each other, selected from the group consisting of hydrogen, halogen, —R, —OR, —OSO$_2$CF$_3$, —OCOR, —SR, —NR$_2$ and —PR$_2$ groups, wherein R is a linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl or C$_7$–C$_{20}$ arylalkyl radical, optionally containing one or more atoms belonging to Groups 13–17 of the Periodic Table of the Elements (new IUPAC notation), such as B, N, P, Al, Si, Ge, O, S and F atoms; or two X groups form a metallocycle ring containing from 3 to 20 carbon atoms; the substituents X are preferably the same; X' is a coordinating ligand selected from mono-olefins and neutral Lewis bases wherein the coordinating atom is N, P, O or S; p is an integer ranging from 0 to 3, so that the final complex of formula (II) or (III) is overall neutral; s ranges from 0 to 3; and A is a π-allyl or a π-benzyl group.

According to a preferred embodiment of the present invention, the bridging group B corresponds to a structural formula selected from the group consisting of:

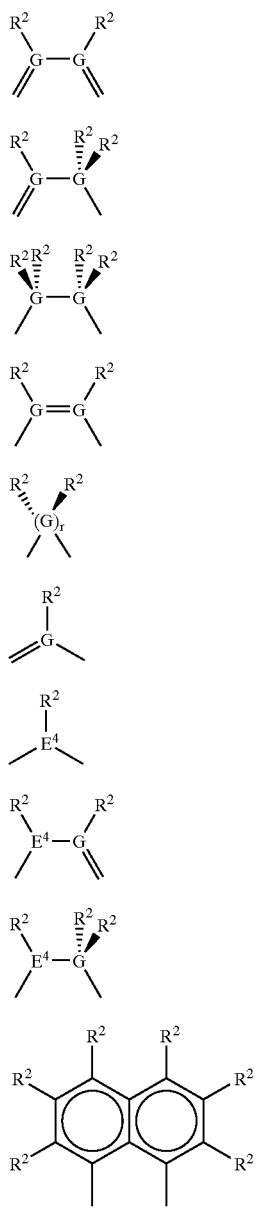

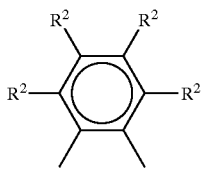

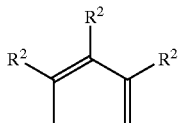

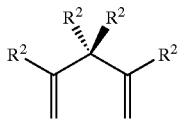

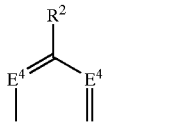

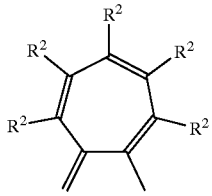

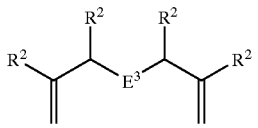

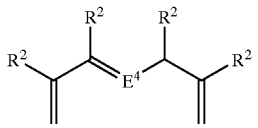

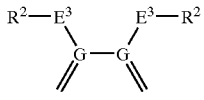

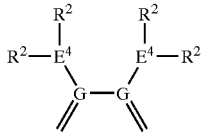

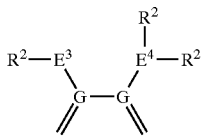

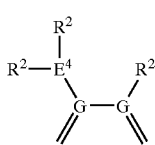

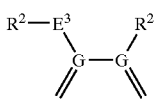
B-22

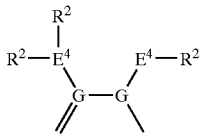
B-23

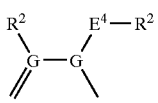
B-24

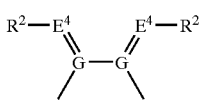
B-25

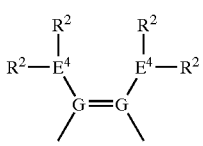
B-26

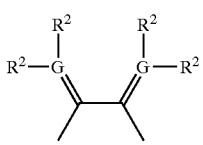
B-27

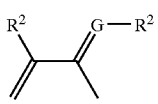
B-28 wherein G is an element belonging to Group 14 of the Periodic Table, and is preferably C, Si or Ge; r is an integer ranging from 1 to 5; $E^3$ is an element belonging to Group 16 and $E^4$ is an element belonging to Group 13 or 15 of the Periodic Table; the substituents $R^2$, the same or different from each other, are selected from the group consisting of hydrogen, linear or branched, saturated or unsaturated $C_1$–$C_{20}$ alkyl, $C_1$–$C_{20}$ alkoxy, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table (such as B, Al, Si, Ge, N, P, O, S, F and Cl atoms); or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element.

In the bidentate or tridentate ligand L of formula (IV), $E^l$ and $E^2$ belong to Group 15 or 16 of the Periodic Table, and preferably are selected from the group consisting of N, P, O, and S.

In the late transition metal compounds of formula (II) or (III), the substituents $R^1$, the same or different from each other, are preferably bulky groups; more preferably, they are $C_6$–$C_{20}$ aryl groups, and even more preferably are substituted in the 2 and 6 positions with a $C_1$–$C_{10}$ alkyl group. The substituents X are preferably hydrogen, methyl, phenyl, Cl, Br or I; p is preferably 1, 2 or 3. When X' is a neutral Lewis base wherein the coordinating atom is N, P, O or S, it is preferably selected from the group consisting of phosphines, amines, pyridines, nitriles, sulfides and ethers; even more preferably, it is selected from the group consisting of triphenylphosphine, tri($C_1$–$C_6$ alkyl)phosphines, tricycloalkyl phosphines, diphenyl allyl phosphines, dialkyl phenyl phosphines, triphenoxyphosphine, pyridine, di($C_1$–$C_3$ alkyl) ether, tetrahydrofuran and nitriles, especially acetonitrile.

When X' is a mono-olefin, it is a hydrocarbyl group having one carbon—carbon double bond, having from 2 to 20 carbon atoms; preferably a substituted or unsubstituted $C_2$–$C_6$ alkene. The variable s is preferably 0 or 1. A is π-allyl or a π-benzyl group.

By a π-allyl group is meant a monoanionic ligand with 3 adjacent sp² carbon atoms bound to a metal center in an $\eta^3$ fashion. The three sp² carbon atoms may be substituted with other hydrocarbyl groups or functional groups. Typical π-allyl groups include:

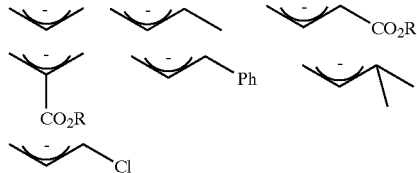

wherein R is hydrocarbyl.

By a π-benzyl group is meant π-allyl ligand in which two of the sp² carbon atoms are part of an aromatic ring. Typical π-benzyl groups include:

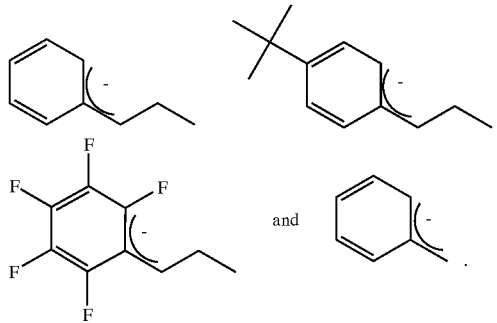

The quantity of transition metal compound present in the component of the present invention can vary over a wide range. Generally the quantity varies between 0.01 and 50 wt. % relative to the total weight of the component, preferably between 0.5 and 25% and more preferably between 1 and 10%. In particular, when the transition metal compound is selected from among the compounds of formula (I) its quantity is preferably between 1 and 6%. As already mentioned, the components of the invention form, with one or more compounds capable of activating the transition metal compound, catalysts that are particularly suitable for the polymerization of olefins. A class of activator compounds that are particularly preferred comprises organometallic compounds of aluminium. Particularly preferred are the alumoxanes and/or a compound able to form an alkyl-metal cation. Suitable activating agents are linear alumoxanes having the formula:

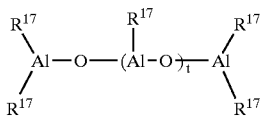

wherein the $R^{17}$ substituents, the same or different from each other, are hydrogen or a linear or branched, saturated or unsaturated $C_1$–$C_{20}$-alkyl, $C_3$–$C_{20}$-cycloalkyl, $C_6$–$C_{20}$-aryl, $C_7$–$C_{20}$-alkylaryl and $C_7$–$C_{20}$-arylalkyl radical, optionally containing Si or Ge atoms; and t is an integer ranging from 0 to 40; or cyclic alumoxanes having the formula:

wherein t is an integer ranging from 2 to 40 and $R^{17}$ has the meaning above.

Examples of alumoxanes suitable as activating cocatalysts in the catalysts system according to the present invention are methylalumoxane (MAO), 2,4,4-trimethyl-pentylalumoxane (TIOAO), 2-methyl-pentylalumoxane and 2,3-dimenthyl-butylalumoxane. Mixtures of different alumoxanes can also be used. Activating cocatalysts suitable as component (B) in the catalysts of the invention are also the product of the reaction between water and an organometallic aluminum compound; particularly suitable are the organometallic aluminum compounds described in the European patent application EP 0 575 875 (formula (II)) and in the international patent applications WO 96/02580 (formula (II)), WO 99/21899 (formula (II)) and in the European patent application no. 99203110.4 (formula (II)). Non-limiting examples of organometallic aluminum compounds are:

tris(methyl)aluminum, tris(isobutyl)aluminum,
tris(2,4,4-trimethyl-pentyl)aluminum bis(isobutyl) aluminum hydride,
bis(2,4,4-trimethylpentyl)aluminum hydride isobutyl-bis(2, 4,4-trimethyl-pentyl)aluminum
tris(2,3-dimethyl-hexyl)aluminum tris(2,3,3-trimethyl-butyl)aluminum
tris(2,3-dimethyl-butyl)aluminum tris(2,3-dimethyl-pentyl) aluminum
tris(2-methyl-3-ethyl-pentyl)aluminum tris(2-ethyl-3-methyl-butyl)aluminum
tris(2-ethyl-3-methyl-pentyl)aluminum tris(2-isopropyl-3-methyl-butyl)aluminum
tris(2,4-dimethyl-heptyl)aluminum tris(2-phenyl-propyl) aluminium
tris[2-(4-fluoro-phenyl)-propyl]aluminium tris[2-(4-chloro-phenyl)-propyl]aluminium
tris[2-(3-isopropyl-phenyl)-propyl]aluminium tris(2-phenyl-butyl)aluminium
tris(3-methyl-2-phenyl-butyl)aluminium tris(2-phenyl-pentyl)aluminium
tris[2-(pentafluorophenyl)-propyl]aluminium tris[2,2-diphenyl-ethyl]aluminium and
tris[2-phenyl-2-methyl-propyl]aluminium.

Mixtures of different organometallic aluminum compounds and/or alumoxanes can also be used. The molar ratio between aluminum and the metal M of the bridged metallocene compound is preferably comprised between 10:1 and 50,000:1, and more preferably between 100:1 and 4,000:1. Further alumoxanes suitable as activating agents in the process of the present invention are alkylhaloaluminoxanes, as described in the International Patent Application WO 00/22007, and in particular 1,3-dichloro-1,3-diethyldialuminoxane [EtAlCl]$_2$O and 1,3-dichloro-1,3-diisobutylaluminoxane [iBuAlCl]$_2$O. Other compounds capable of activating the transition metal compounds described previously are the compounds able to form an alkylmetallocene cation; preferably said compounds have formula $Y^+Z^-$, wherein $Y^+$ is a Brønsted acid, able to donate a proton and to react irreversibly with a substituent X of the metallocene compound of formula (I), and $Z^{31}$ is a compatible non-coordinating coordinating anion, able to stabilize the active catalytic species which results from the reaction of the two compounds and which is sufficiently labile to be displaceable by an olefin substrate. Preferably, the anion $Z^-$ consists of one or more boron atoms. More preferably, the anion $Z^{31}$ is an anion of the formula $BAr_4^{(-)}$, wherein the substituents Ar, the same or different from each other, are aryl radicals such as phenyl, pentafluorophenyl or bis(trifluoromethyl)phenyl. Tetrakis-pentafluorophenyl borate is particularly preferred. Other useful non-coordinating anions $Z^-$ can be $SbF_6^-$, $PF_6^-$, $BF_4^-$, trifluoromethanesulphonate and p-toluenesulphonate. Moreover, neutral Lewis acids such as $BAr_3$, $SbF_5$ and $BF_3$ can conveniently be used. The solid components according to the present invention can be prepared by a process comprising (a) dispersing a homogeneous transition metal compound according one or more of formulae (I)–(III) above, in a hydrocarbon matrix having a melting point above 70° C. which has been brought in a liquid form and (b) solidifying the said matrix, containing the said transition metal compound, in the form of spherical particles.

According to a particular embodiment the transition metal compound is dispersed, with the aid of a mixer, in the molten hydrocarbon matrix and the mixture thus obtained is sprayed under temperature conditions such as to cause immediate solidification of the droplets as spherical particles. The conditions under which spraying and immediate cooling take place (flow rate and pressure of the carrier gas and its ratio to the quantity of mixture to be sprayed; flow rate, pressure and temperature of the cooling gas) can be properly selected according to the knowledge of the skilled in the art, in order to obtain average diameters of the solid particles over quite a wide range. In particular the solid particles that constitute the solid components of the present invention have a spherical morphology and dimensions between 1 and 400 μm and preferably between 10 and 300 μm. The term spherical morphology means, according to the present invention, particles possessing a ratio between maximum diameter and minimum diameter of less than 1.5 and preferably less than 1.3.

Before being dispersed in the matrix the transition metal compound is preferably dissolved with a minimum amount of solvent. For this purpose it is possible to use any inert hydrocarbon medium in which the transition metal compound is soluble, for example toluene, benzene and similar hydrocarbons. In particular, whenever possible, it is preferable to use a hydrocarbon solvent that has a boiling point below 120° C. so as to facilitate its removal from the final product. The use of a low boiling solvent assisting both the dispersion of the transition metal compound and the availability of the hydrocarbon matrix in liquid form is particularly preferred when the transition metal compound can decompose at temperatures at which the hydrocarbon matrix melts in absence of solvent. In this case the concomitant use of a solvent which is able to at least partially solubilize the matrix can allow to lower the temperature at which the hydrocarbon matrix/solvent system becomes sufficiently and homogeneously liquid to permit the dispersion of the transition metal compound. In a particular aspect of the present invention, the solution of the said transition metal compound is brought into contact with the matrix in the solid state which is then melted, while stirring. In particular, excellent results have been obtained by dissolving, together with the transition metal compound, also the activator component for example $AlEt_2Cl$ (DEAC) or a polyalkyl-alumoxane of the type previously described, and in particular MAO or its mixtures with an Al-alkyl compound, using molar ratios of alkyl-Al compound/transition metal compound greater than 2, preferably between 5 and 500. The solutions that are obtained are in fact particularly suitable for providing components of catalysts that have high activity. An alternative method of preparation of the components of the invention comprises:

(i) feeding the hydrocarbon matrix and the transition metal compound, possibly precontacted with the activator compound, into an extruder;

(ii) extruding the said mixture in the form of filaments and (iii) cutting the said filaments before they have solidified completely, obtaining discrete particles. The catalysts of the present invention have wide applications. In particular they can be used in all the olefin polymerization processes in which said transition metal compound catalysts are normally employed. For example, they can be used in the (co)polymerization of olefins of the type $CH_2=CHR$ or of the type $RCH=CHR$ in which R is an hydrocarbon radical with 1–10 carbon atoms, of cyclic olefins and diene or polyene monomers. Furthermore, they can be used in the (co) polymerization of $CH_2=CHR$ olefins with polar monomers such as carbon monoxide, vinylacetate, maleic anhydride, halogenated olefins, for the preparation of modified polyolefins such as ethylene-vinylacetate (EVA) copolymers, copolymers of ethylene or propylene with maleic anhydride, or copolymers of ethylene and carbon monoxide (polyketones).

In particular the catalysts obtained from compounds of the type $C_2H_4(Ind)_2ZrCl_2$, $C_2H_4(H_4Ind)ZrCl_2$ and $Me_2Si(Me_4Cp)_2ZrCl_2$ are suitable for production of LLPDE (copolymers of ethylene containing smaller proportions, generally less than 20 mol. %, of $C_3$–$C_{12}$ alpha olefin) characterized by relatively low values of density relative to the content of alpha olefin, by reduced solubility in xylene at room temperature (less than approx. 10 wt. %) and by molecular weight distribution Mw/Mn between about 2.5 and 5.

The catalysts of the present invention can be used in the polymerization of olefins either carried out in the liquid phase, such as solution or suspension, or in gas-phase processes. In particular the use of the catalysts of the invention in the gas-phase processes is especially preferred as it makes it possible to obtain polymers that have good morphological properties. The said gas-phase process can be carried out working in one or more fluidized-bed or mechanically-stirred reactors. Polymerization is generally carried out at temperatures between 40 and 120° C., preferably between 50 and 90° C. When working in the gas phase, the working pressure is generally between 0.5 and 10 MPa, preferably between 1 and 2 MPa. Hydrogen or other compounds known in the art having the same function can be used as molecular weight regulators. Moreover, it is possible, prior to polymerization, to carry out a stage of pre-polymerization such as to make the said catalyst particularly suitable for the next polymerization stage. The pre-polymerization stage is particularly recommended whenever a solid hydrocarbon matrix is used that has a melting point below the temperature of the polymerization stage. In this case it is particularly preferred to carry out pre-polymerization at temperatures below the melting point of the hydrocarbon matrix with the aim of avoiding the loss of morphological properties owing to melting of the hydrocarbon matrix in the reactor. In this case the pre-polymerization is carried out in particular at temperatures between −10 and 70° C. and preferably at temperatures between 0 and 50° C. In general, the pre-polymerization can be carried out in the liquid phase, comprising an inert hydrocarbon solvent such as propane, hexane, heptane, isobutane or a monomer, or in the gas phase working at temperatures generally below 100° C., preferably between 20 and 70° C. As explained above, the pre-polymerization in gas-phase is especially preferred because it allows to preserve the morphology of the catalysts component. The pre-polymerization is carried out by polymerizing small amounts of monomer for the time necessary to obtain quantities of polymer between 0.5 g and 2000 g per g of solid component, preferably between 5 and 500 g per g of solid component and more preferably between 10 and 100 g per gram of solid component. Preferably, pre-polymerization is carried out with ethylene, propylene or their mixtures. The pre-polymerized catalyst thus obtained is then used in the next polymerization stage. The process for the polymerization of olefins according to the invention can be carried out in the liquid phase in the presence or absence of an inert hydrocarbon solvent, or in the gas phase. The hydrocarbon solvent can either be aromatic, such as toluene, or aliphatic, such as propane, hexane, heptane, isobutane or cyclohexane. The polymerization temperature is generally between −100° C. and +100° C., particularly between 10° C. and +90° C. The polymerization pressure is generally between 0.5 and 100 bar.

The following examples are given by way of illustration of the invention and are non-limiting. The properties indicated are determined according to the following methods:

The size of the catalyst particles is determined by a method based on the principle of the optical diffraction of monochromatic laser light with the "Malvern Instr. 2600" apparatus. The average size is given as P50.

The intrinsic viscosity is determined in tetraline at 135° C.

EXAMPLES

Example 1

10 g of TIBAO (300 g/l solution in cyclohexane) and 310 mg of rac-ethylene-bis-(dimethyl-indenyl)-zirconium dichloride are pre-contacted for 5 minutes at room temperature in a glass flask previously treated with $N_2$. 15 g of a paraffinic wax with melting point of 105–110° C. (Lubriol C109) is added to the solution thus obtained. The suspension is kept stirred and is heated to a temperature of 100° C., and connected to a vacuum pump to remove the solvent. When boiling is no longer observed, the temperature is raised again to 120° C., obtaining a homogeneous liquid phase of a yellowish-brown colour. The melt thus obtained is transferred to the jacketed vessel, heated to 130° C., that supplies the sprayer. The molten mixture is then sprayed in conditions such as to obtain spheres with average diameter of 180 µm and with the following composition: Zr=0.18%; Al=5.8%.

Example 2

In a glass flask treated with $N_2$, 3.8 g of triisooctyl aluminium (TIOA) is pre-contacted with 24 cm³ of a solution of methyl alumoxane (MAO) at 10% in toluene and they are left to react for 20 min at room temperature. 240 mg of rac-ethylene-bis-(dimethyl-indenyl)-zirconium dichloride is added to this mixture and they are left to pre-contact for 10 minutes at room temperature. 9.9 g of a paraffinic wax with a melting point of 105–110° C. (Lubriol C109) is added to the solution thus obtained. The suspension is kept stirred and is heated to a temperature of 100° C., and is connected to a vacuum pump to remove the solvent. When boiling is no longer observed, the temperature is raised again to 120° C., obtaining a homogeneous liquid phase of a yellowish-brown colour. The melt thus obtained is transferred to the jacketed vessel, heated to 130° C., which supplies the sprayer. The molten mixture is then sprayed, collecting the droplets in an $N_2$ atmosphere at a temperature of approx. 10° C. to speed up the solidification of the droplets. Spheres are collected having average diameter of 100 μm and the following composition: Zr=0.29%; Al=8.68%.

Example 3

Polymerization of Ethylene

A 4L stainless-steel reactor, equipped with a thermosetting jacket, a magnetic stirrer, pressure indicator, temperature indicator feed line for monomer equipped with a thermal mass flowmeter to measure the ethylene uptake is used. 1600 ml of hexane is loaded into the reactor at approximately 30° C., followed by 0.2 g of tri-isobutyl aluminum as the scavenger. The polymerization is started by injecting 670 mg of the catalyst prepared as in Example 1 by means of nitrogen overpressure. The reactor temperature is increased up to 70° C. in 10–15 minutes. At 70° C. ethylene is continuously fed to maintain a pressure of 10 barg. The polymerization is stopped after 2 hours by venting and cooling the reactor: The polymer suspension discharged is dried in an oven at 80° C. under nitrogen atmosphere. 300 g of polymer is obtained with intrinsic viscosity [η]=3.15 dL/g for a yield of 170 kgPE/g Zr.

Example 4

A fluidized bed reactor equipped with a compressor to re-circulate the gas to the reactor after passing though a heat exchanger unit was used. The equipment is provided with a small pre-polymerization vessel connected to the gas phase reactor. 600 mg of the catalyst prepared as in example 2 was loaded in the 0.5 L pre-polymerization reactor equipped with a stirrer and previously purged with propane and TIBA as scavenger at 90° C. for 2 hours. The pre-polymerization was carried out in slurry at 30° C. in 0.3 L of liquid propane and 30 g of ethylene. After 30 minutes the slurry was transferred to the fluidized bed to continue the polymerization in gas phase at 70° C. and 12 bar of ethylene partial pressure. After 4 hours of polymerization the reactor was cooled and vented and the polymer recovered. 120 g of spherical particles were obtained for an activity of 200 g PE/g cat and with a bulk density of 0.289 g/cc. The I.V. of the polyethylene produced was 9.86 dL/g.

What is claimed is:

1. A spherical catalyst component for the polymerization of olefins of formula RCH=CHR, in which R is, independently, hydrogen or a hydrocarbon group with 1–10 carbon atoms, comprising a homogeneous transition metal compound of formula $MP_x$, in which M is a transition metal from Groups 3 to 11 or the lanthanide or actinide Groups of the Periodic Table of the Elements (new IUPAC version), P is a ligand that is coordinated to the metal M and x is the valence of the metal M, and the transition metal compound is dispersed within solid paraffinic waxes having a melting point above 70° C.

2. The spherical catalyst component according to claim 1, in which the solid paraffinic waxes have a melting point above 80° C.

3. The spherical catalyst component according to claim 2, in which the solid paraffinic waxes have a melting point above 90° C.

4. The spherical catalyst component according to claim 1, in which the transition metal compound has the formula (I)

$$QL_lZMX'_p \qquad (I)$$

wherein Q is a substituted or unsubstituted cyclopentadienyl radical, which can have one or more condensed cycles, optionally containing heteroatoms; Z has the same meaning as Q or is =NR$^8$, —O—, —S— or —PR$^8$, wherein R$^8$ is hydrogen or a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-aralkyl radical which can contain a heteroatom; L is a divalent bridge connecting Q and Z selected from the group consisting of $C_1$–$C_{20}$-alkylidene, $C_3$–$C_{20}$-cycloalkylidene, $C_2$–$C_{20}$-alkenylidene, $C_6$–$C_{20}$-arylidene, $C_7$–$C_{20}$-alkylarylidene or $C_7$–$C_{20}$-aralkylidene radicals, which can contain a heteroatom, $CR^3_2$, $C_2R^3_4$, $SiR^3_2$, $Si_2R^3_4$ and $CR^3_2SiR^3_2$ wherein $R^3$ is hydrogen or a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-aralkyl radical which can contain a heteroatom; M is a transition metal M from Groups 3 to 10 or the lanthanide or actinide Groups of the Periodic Table of the Elements (new IUPAC version), X; same or different, is hydrogen, a halogen or a $R^9$, $OR^9$, $OSO_2CF_3$, $OCOR^9$, $SR^9$, $NR^9_2$ or $PR^9_2$ group, wherein $R^9$ is hydrogen or a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containing a heteroatom; p is an integer of from 0 to 3 which is equal to the oxidation state of the metal M minus 2; and l is 0 or 1.

5. The spherical catalyst component of claim 1, in which the transition metal compound is a late transition metal complex corresponding to formula (II) or (III):

$$LMX_pX'_s \qquad (II)$$

$$LMA \qquad (III)$$

wherein M is a metal of Group 8, 9, 10 or 11 of the Periodic Table of the Elements (new IUPAC notation);

L is a bidentate or tridentate ligand of formula (IV):

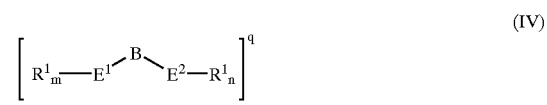

$$\left[ R^1_m\!-\!E^1\overset{B}{\diagdown}E^2\!-\!R^1_n \right]^q \qquad (IV)$$

wherein

B is a $C_1$–$C_{50}$ bridging group linking $E^1$ and $E^2$, optionally containing one or more elements of Groups 13–17 of the Periodic Table;

$E^1$ and $E^2$, the same or different from each other, are elements belonging to Group 15 or 16 of the Periodic Table and are bonded to metal M;

$R^1$, the same or different from each other, is hydrogen or a linear or branched, saturated or unsaturated $C_1$–$C_{20}$ alkyl, $C_1$–$C_{20}$ alkylidene, $C_3$–$C_{20}$ cycloalkyl, $C_6$–$C_{20}$ aryl, $C_7$–$C_{20}$ alkylaryl and $C_7$–$C_{20}$ arylalkyl radical, optionally containing one or more elements of Groups 13–17 of the Periodic Table of the Elements; or two $R^1$ substituents are attached to the same atom $E^1$ or $E^2$ to form a saturated, unsaturated or aromatic $C_4$–$C_8$ ring, having from 4 to 20 carbon atoms;

m and n are independently 0, 1 or 2, depending on the valence of $E^1$ and $E^2$, so as to satisfy the valence number of $E^1$ and $E^2$; q is the charge of the bidentate or tridentate ligand so that the oxidation state of $MX_pX'_s$ or MA is satisfied, and the complex of formula (II) or (III) is overall neutral;

X, the same or different from each other, is hydrogen, halogen, —R, —OR, —$OSO_2CF_3$, —OCOR, —SR, —$NR_2$ or —$PR_2$, wherein R is a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing one or more elements of Groups 13–17 of the Periodic Table of the Elements (new IUPAC notation); or two X substitutents form a metallocycle ring containing from 3 to 20 carbon atoms;

X' is a coordinating ligand selected from the group consisting of mono-olefins and neutral Lewis bases wherein the coordinating atom is N, P, O or S;

p is an integer ranging from 0 to 3 so that the final complex of formula (II) or (III) is overall neutral; s ranges from 0 to 3; and A is a π-allyl or a π-benzyl group.

6. The spherical catalyst component according to claim 2, in which the transition metal compound has the formula (I)

$$QL_lZMX^l_p \qquad (I)$$

wherein Q is a substituted or unsubstituted cyclopentadienyl radical, which can have one or more condensed cycles, optionally containing heteroatoms; Z has the same meaning as Q or is =$NR^8$, —O—, —S— or =$PR^8$, wherein $R^8$ is hydrogen or a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical which can contain a heteroatom; L is a divalent bridge connecting Q and Z selected from the group consisting of $C_{1-C20}$-alkylidene, $C_{3-C20}$-cycloalkylidene, $C_{2-C20}$-alkenylidene, $C_6$–$C_{20}$-arylidene, $C_7$–$C_{20}$-alkylarylidene or $C_7$–$C_{20}$-aryalkylidene radicals, which can contain a heteroatom, $CR^3_2$, $C_2R^3_4$, $SiR^3_2$, $Si_2R^3_4$ and $CR^3_2SiR^3_2$, wherein $R^3$ is hydrogen or a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-aryalkyl radical which can contain a heteroatom; M is a transition metal M from Groups 3 to 10 or the lanthanide or actinide Groups of the Periodic Table of the Elements (new IUPAC version); X, same or different, is hydrogen, a halogen or a $R^9$, $OR^9$, $OSO_2CF_3$, $OCOR^9$, $SR^9$, $NR^9_2$ or $PR_{92}$ group, wherein $R^9$ is hydrogen or a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containing a heteroatom; p is an integer of from 0 to 3 which is equal to the oxidation state of the metal M minus 2; and 1 is 0 or 1.

7. The spherical catalyst component of claim 2, in which the transition metal compound is a late transition metal complex corresponding to formula (II) or (III):

$$LMX_pX'_s \qquad (II)$$

$$LMA \qquad (III)$$

wherein M is a metal of Group 8, 9, 10 or 11 of the Periodic Table of the Elements (new IUPAC notation);

L is a bidentate or tridentate ligand of formula (IV):

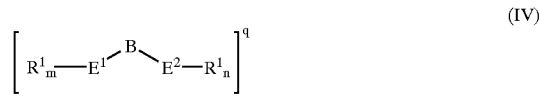

$$\left[ R^1_m\text{—}E^1\overset{B}{\diagdown}E^2\text{—}R^1_n \right]^q \qquad (IV)$$

wherein B is a $C_1$–$C_{50}$ bridging group linking $E^1$ and $E^2$, optionally containing one or more elements of Groups 13–17 of the Periodic Table; $E^1$ and $E^2$, the same or different from each other, are elements belonging to Group 15 or 16 of the Periodic Table and are bonded to metal M; $R^1$, the same or different from each other, is hydrogen or a linear or branched, saturated or unsaturated $C_1$–$C_{20}$ alkyl, $C_1$–$C_{20}$ alkylidene, $C_3$–$C_{20}$ cycloalkyl, $C_6$–$C_{20}$ aryl, $C_7$–$C_{20}$ alkylaryl and $C_7$–$C_{20}$ arylalkyl radical, optionally containing one or more elements of Groups 13–17 of the Periodic Table of the Elements; or two $R^1$ substituents are attached to the same atom $E^1$ or $E^2$ to form a saturated, unsaturated or aromatic $C_4$–$C_8$ ring, having from 4 to 20 carbon atoms; m and n are independently 0, 1 or 2, depending on the valence of $E^1$ and $E^2$, so as to satisfy the valence number of $E^1$ and $E^2$; q is the charge of the bidentate or tridentate ligand so that the oxidation state of $MX_pX'_s$ or MA is satisfied, and the complex of formula (II) or (III) is overall neutral; X, the same or different from each other, is hydrogen, halogen, —R, —OR, —$OSO_2CF_3$, —OCOR, —SR, —$NR_2$ or —$PR_2$, wherein R is a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing one or more elements of Groups 13–17 of the Periodic Table of the Elements (new IUPAC notation); or two X substitutents form a metallocycle ring containing from 3 to 20 carbon atoms; X' is a coordinating ligand selected from the group consisting of mono-olefins and neutral Lewis bases wherein the coordinating atom is N, P, O or S; p is an integer ranging from 0 to 3 so that the final complex of formula (II) or (III) is overall neutral; s ranges from 0 to 3; and A is a π-allyl or a π-benzyl group.

8. A catalyst for the (co)polymerization of olefins of the formula RCH=CHR, in which R is, independently, a hydrogen or a hydrocarbon group with 1–10 carbon atoms, comprising the reaction product of (i) a spherical catalyst component comprising a homogeneous transition metal compound of formula $MP_x$, in which M is a transition metal of Groups 3–11 of the lanthanide or actinide Groups of the Periodic Table of the Elements (new IUPAC version) P is a ligand that is coordinated to the metal M and x is the valence of the metal M, wherein the transition metal compound is dispersed within solid paraffinic waxes having a melting point above 70° C. and (ii) one or more activator compounds.

9. The catalyst of claim 8, in which the activator compound is an organometallic compound of aluminium.

10. The catalysts of claim 9, in which the activator compound is a linear alumoxane of the formula:

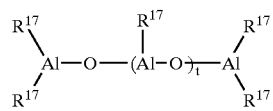

$$R^{17}\diagdown_{Al}\text{—}O\text{—}(Al\text{-}O)_{\!\overline{t}}\text{—}Al\diagup^{R^{17}}_{\diagdown R^{17}}$$

wherein $R^{17}$, the same or different from each other, is hydrogen or a linear or branched, saturated or unsaturated $C_1$–$C_{20}$-alkyl, $C_3$–$C_{20}$-cycloalkyl, $C_6$–$C_{20}$-aryl, $C_7$–$C_{20}$-alkylaryl and $C_7$–$C_{20}$-arylalkyl radical, optionally containing Si or Ge; and is an integer ranging from 0 to 40;

or cyclic alumoxanes having the formula:

wherein t is an integer ranging from 2 to 40 and $R^{17}$ has the meaning above.

11. The catalyst of claim 10 in which the alumoxane, optionally mixed with the organometallic compounds of aluminium, is used in quantities such that the molar ratios Al/transition metal compound are greater than 2.

12. The catalyst of claim 11, in which the molar ratio Al/transition metal compound is between 10:1 and 5000:1.

13. A process for the preparation of a spherical catalyst component comprising a homogeneous transition metal compound of formula $MP_x$ in which M is a transition metal from Groups 3 to 11 or the lanthanide or actinide Groups of the Periodic Table of the Elements (new IUPAC version), P is a ligand that is coordinated to the metal M and x is the valence of the metal M, and the transition metal compound is dispersed within a solid hydrocarbon matrix having a melting point above 70° C., the process comprising (a) dispersing the homogeneous transition metal compound in the hydrocarbon matrix which is in a liquid form, wherein the hydrocarbon matrix has been melted, and (b) solidifying the matrix containing the transition metal compound in the form of spherical particles.

14. The process according to claim 13, in which the matrix in liquid form containing the transition metal compound is sprayed under temperature conditions so as to cause solidification of the droplets in the form of spherical particles.

15. The process of claim 13, in which the transition metal compound, before being dispersed in the matrix, is dissolved in a minimum quantity of solvent.

16. The process of claim 15, in which the solvent is a hydrocarbon solvent having a boiling point at atmospheric pressure of less than 120° C.

17. The process of claim 15, in which the transition metal compound is dissolved together with an activator compound.

18. The process of claim 17, in which the activator compound is a linear alumoxane of the formula:

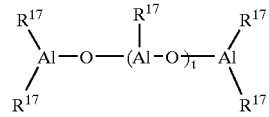

wherein $R^{17}$, the same or different from each other, is hydrogen or a linear or branched, saturated or unsaturated $C_1$–$C_{20}$-alkyl, $C_3$–$C_{20}$-cycloalkyl, $C_6$–$C_{20}$-aryl, $C_7$–$C_{20}$-alkylaryl and $C_7$–$C_{20}$-arylalkyl radical, optionally containing Si or Ge; and t is an integer ranging from 0 to 40.

19. A process for the (co)polymerization of olefins of the formula RCH=CHR, in which R is, independently, hydrogen or a hydrocarbon group having 1–10 carbon atoms, wherein the process is carried out in the presence of the catalyst of claim 8.

* * * * *

UNITED STATES PATENT AND TRADEMARK OFFICE
CERTIFICATE OF CORRECTION

PATENT NO.   : 6,703,458 B2
DATED        : March 9, 2004
INVENTOR(S)  : Anna Fait It is certified that error appears in the above-identified patent and that said Letters Patent is hereby corrected as shown below:

<u>Column 14,</u>
Line 15, change "=NR$^8$" to -- -NR$^8$ --

<u>Column 15,</u>
Line 36, change "=NR$^8$" to -- -NR$^8$ --
Line 36, change "=PR$^8$" to -- -PR$^8$ --

Signed and Sealed this

Fourth Day of January, 2005

JON W. DUDAS
*Director of the United States Patent and Trademark Office*